Patented Dec. 30, 1930

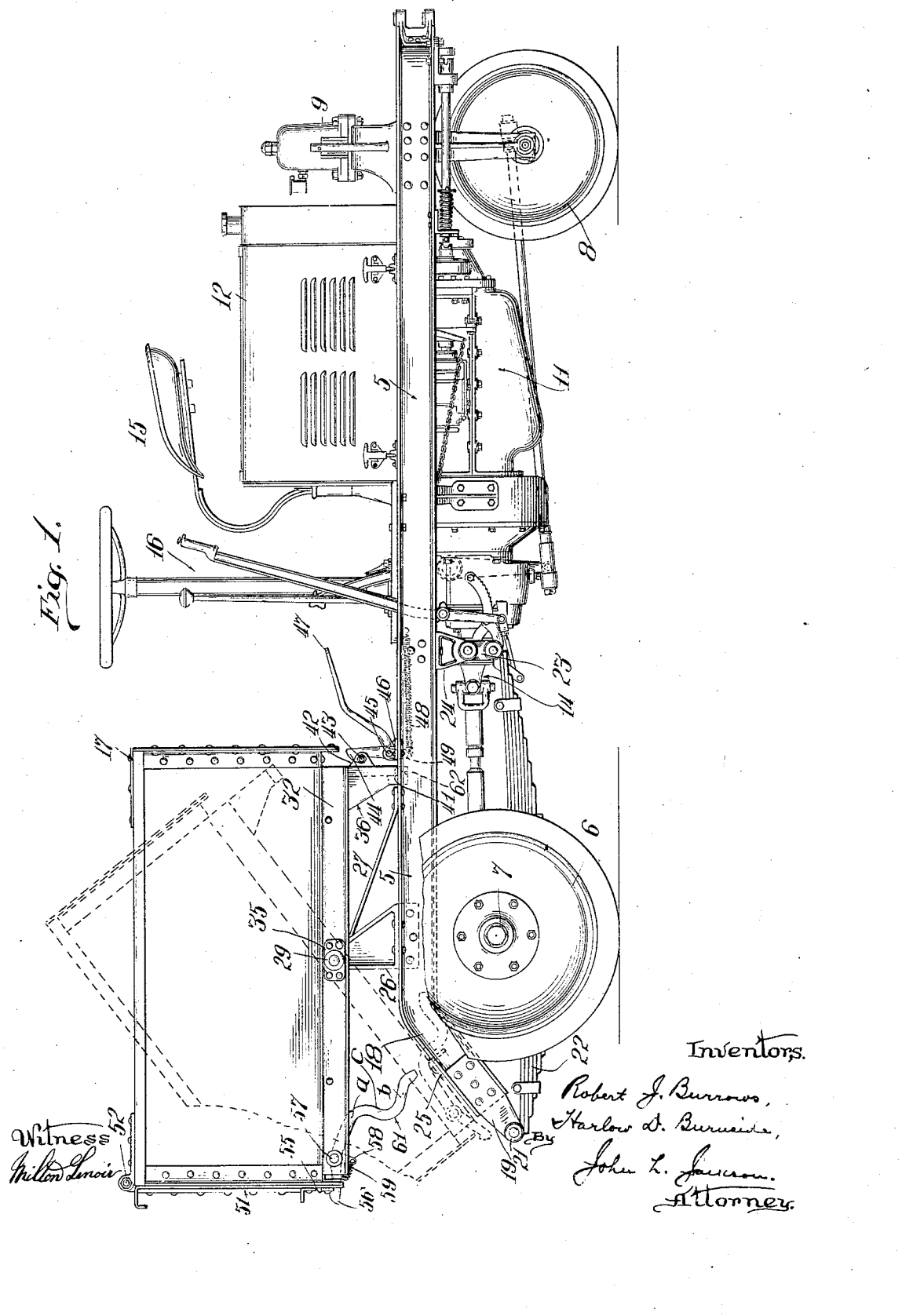
Dec. 30, 1930.   R. J. BURROWS ET AL   1,786,560
DUMPING TRUCK
Filed June 9, 1926   2 Sheets-Sheet 1

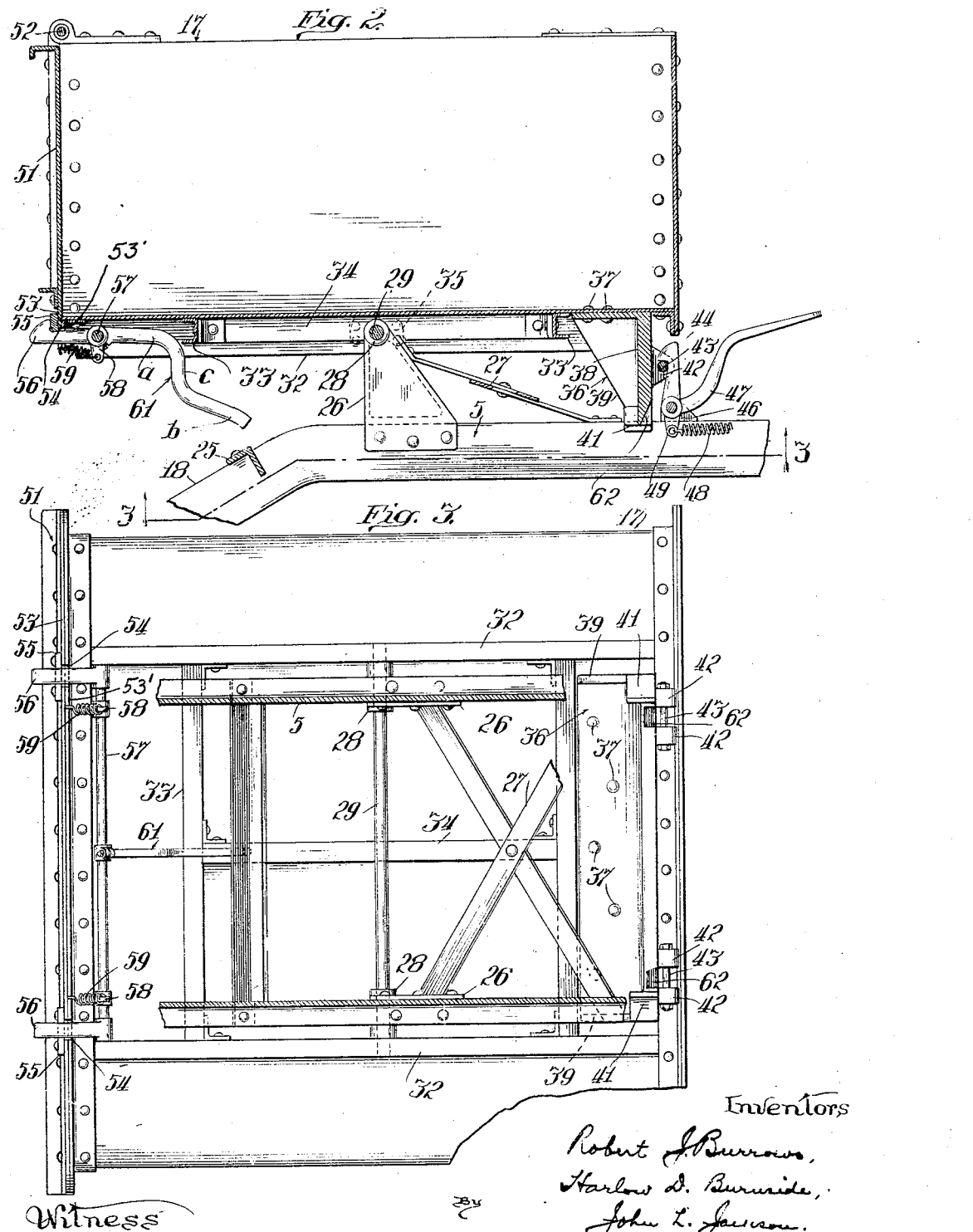

1,786,560

UNITED STATES PATENT OFFICE

ROBERT J. BURROWS, OF BUCHANAN, AND HARLOW D. BURNSIDE, OF BATTLE CREEK, MICHIGAN, ASSIGNORS TO CLARK TRUCTRACTOR COMPANY, OF BUCHANAN, MICHIGAN, A CORPORATION OF MICHIGAN

DUMPING TRUCK

Application filed June 9, 1926. Serial No. 114,670.

Our invention relates to industrial trucks of the general type shown and described in Letters Patent to Robert J. Burrows, No. 1,390,757, dated September 13, 1921, in which a load carrying bed is mounted at the front end of the frame over a pair of propelling wheels, the frame being supported at the rear by a steering wheel or wheels of the caster type, and a motor by which the front wheels are driven, being mounted on the rear portion of the frame. In the truck of said patent the operator's station is between the motor and the bed, his seat being placed over the hood that encloses the motor. Trucks of this type are used principally in and about factory buildings or warehouses, etc., and in many situations it is desirable that the bed be arranged so that it may be tilted about a transverse axis to dump its contents beyond the forward end of the truck, and the object of our invention is to provide a dumping truck of that character so constructed that it may be run up to the point at which the load is to be discharged and be dumped with very little effort on the part of the operator, if not entirely automatically. With this end in view, it contemplates the provision of a bed which is so pivoted on the frame of the vehicle that when loaded it dumps easily either because of overbalancing of the load, or by the sheer momentum of the load when the vehicle is stopped suddenly (a holding latch for the bed having been previously released), and when empty it automatically returns, or is easily returned, to normal position. The invention also contemplates the provision of a particular construction of vehicle frame having a downwardly sloped front end. By virtue of this frame construction, the bed can be pivotally supported with its center of gravity located substantially directly above the driving axle, for transmitting maximum traction pressure to the drive wheels, and from this pivotal center the bed can be inclined down to a relatively acute dumping angle without interference with the frame, because of this downwardly sloped front end.

In the accompanying drawings, we have illustrated a dumping truck of the character above described, Figure 1 being a side elevation of the truck illustrating the normal position of the bed in full lines and its dumping position in dotted lines;

Fig. 2 is a longitudinal sectional view through the bed; and

Fig. 3 is a horizontal sectional view taken approximately on the plane of the line 3—3 of Fig. 2, looking up.

Referring to Fig. 1, the two side frame members of the truck are indicated at 5—5, these frame members being preferably of channel section. The front portion of the truck frame is supported on propelling wheels 6, having an axis or axle 7, and the rear portion of the truck is suppported on the dirigible caster wheel 8 having a pivoted resilient mounting in an upright bearing bracket 9 secured to the rear end of the frame. The power plant 11, supported at the rear end of the frame and enclosed under the hood 12, drives the propelling wheels 6 through any suitable construction of drive mechanism, designated 14 in its entirety. The driver's seat 15 is supported over the engine hood 12 and the controls, collectively indicated at 16, are disposed between the driver's seat and the dumping bed or body 17.

The front ends of the channel frame members 5 are bent diagonally downward, as indicated at 18. Bracket arms 19 are riveted to these downwardly inclined ends 18 and have eyes 21 at their ends for making pivotal connection with the front or outer ends of the leaf springs 22. The rear or inner ends of such leaf springs have connection through the conventional shackle links 23 and brackets 24 to the frame of the vehicle, these leaf springs being under-slung in their attachment to the axle of the wheels 6. A cross bar 25, preferably of angle iron, extends across the sloping end portions 18 of the frame members and is firmly secured thereto for a purpose which will be hereinafter explained. Rising from the side members 5, adjacent to and preferably a short distance back of the inclined ends, are standards 26 which are suitably braced to said side frame members by braces 27, said standards being provided at their upper ends with bearings 28, shown in Figs. 2 and 3, in which is mounted a transverse shaft 29. Said shaft forms a transverse pivot for the dumping bed or body 17, which is mounted on said shaft at a point located slightly back of the longitudinal center, or center of gravity of the bed, substantially as indicated. By this arrangement when the bed is tilted to the position shown in dotted lines, its bottom will aline substantially with the upper surfaces of the inclined front end portions 18 of the frame members 5. As hereinafter described, in detail, by inclining the front end portions of the side members 5 in this manner and mounting the bed to pivot about a transverse axis disposed back of its longitudinal center, while the load will be carried substantially in the vertical axial plane of the driving wheels 6, the center of gravity of the loaded bed will lie somewhat forward of its transverse axis, so that it may be dumped with very little effort, or in some cases, entirely automatically, either by the overbalance of the load alone, or by the inertia of the load, if the vehicle be stopped suddenly. The arrangement shown also provides for dumping the load very close to the front end of the truck.

As shown in Figs. 2 and 3, the bed comprises a bottom frame composed of longitudinally extending side members 32 connected by cross members 33, the latter being reinforced by a longitudinal member 34. The shaft 29 extends through the side members 32, which are provided at the outside with bearing plates 35 therefor.

To facilitate righting it, at its rear end the bed 17 is provided with a counterbalance comprising a horizontal plate 36, extending transversely of the box adjacent to its rear end and secured to the bottom thereof by rivets 37 or in any other suitable way, said counterbalance also comprising a vertically disposed plate 38 which depends from the rear marginal portion of the plate 36 and is braced therewith by end flanges 39. The end portions of the vertical plate 38 are adapted to engage the side bars 5 of the truck frame and are preferably notched, as shown at 41, so that that portion of the plate 38 between the notches 41 may extend down between the frame members 5. The plate 38 therefore serves as a standard to support the rear portion of the bed or box on the truck frame when said bed is in its normal position. The weight of the counterbalance is sufficient to overcome the preponderating weight of that portion of the empty bed that lies in advance of its transverse axis, and therefore, after the load has been dumped, said counterbalance aids in righting the bed.

Adjacent to each end the plate 38 is provided with a pair of lugs 42, which carry a horizontal pin 43 which serves as a keeper for the latch 44. Two of such latches are provided, one for each pin 43, said latches being carried by a rock shaft 45, mounted in bearings 46 secured to the side members 5, as best shown in Fig. 1. Said rock shaft has secured thereto a foot lever 47 by which it may be rocked to move the latches 44 out of engagement with their respective pins 43, and a spring 48 is provided which is connected at one end with the truck frame and at the other end with an arm 49 carried by the rock shaft 45. Said spring is so arranged that it tends to move the latches 44 into engagement with the pins 43, so that after said latches have been moved out of operative position by downward movement of the treadle or lever 47, the spring 48 tends to return them to such position. A stop of any suitable character may be provided to prevent the latches 44 from swinging forward beyond an approximately vertical position. It will be apparent from the foregoing description that when the latches 44 are in engagement with the pins 43 the bed will be held in its horizontal or operative position, and that by depressing the foot lever 47 to move said latches out of engagement with the pins 43, the bed may be tilted in the manner indicated by dotted lines in Fig. 1.

At the front end of the bed 17 is an end gate 51, which at its upper margin is pivotally connected with the bed by a pivot rod 52, so that the lower margin of the end gate may swing toward and from the bottom of the bed. Said gate is provided at its lower margin with a lip 53 engaging a similar lip 53' on the bed, and both having notches 54 near their opposite ends at the bottom of which notches are latch plates 55 adapted to be engaged by latches 56 carried by a rock shaft 57 that extends transversely of the bed at its front end and is mounted in the side bars 32 thereof, as shown in Figs. 2 and 3. Said shaft is provided with a downwardly extending arm 58, with which is connected one end of a spring 59, the opposite end of which is connected with the lip 53', so that the spring tends to move the latches 56 upward into engagement with the latch plates 55 and hold them in such position. Obviously, when the latches 56 are in engagement with the latch plates 55, the end gate is prevented from opening, but by moving the latches out of engagement with the end gate, it is free to swing away from the bottom of the bed to permit its contents to be discharged. Connected with the shaft 57 and extending downwardly and rearwardly therefrom, is a lever 61, the weight of which lever normally aids the spring 59 in moving the latches 56 to their operative position. Said lever is approximately Z-shaped as shown in Fig. 2 and is provided with two substantially straight portions $a$ and $b$, and an intermediate curved portion $c$. The shape of said lever is such that when the bed is tilted, the straight portion $b$ first strikes the cross bar 25 on the truck frame and is deflected by it to rock the shaft 57 in a counterclockwise direction, thereby moving the latches 56 out of operative position. The curved portion $c$ and the straight portion $a$, by their engagement with the cross bar 25, serve to hold the latches out of operative position during the dumping operation, and also during the restoring operation until the bed approaches its normal position, when said lever will move out of engagement with the cross bar 25 and in conjunction with the spring 59 will operate to restore the latches to their locking position. It will be understood that when the bed is returned to its normal position, the end gate will swing back to its closed position and will be automatically engaged and locked shut by said latches. About the same time the latches 44 will engage the pins 43 at the rear end of the bed and will lock the bed in its load carrying position. To facilitate the engagement of the latches 44 with the pins 43, the lower marginal portion of the plate 38 is beveled opposite said pins, as indicated at 62 in Fig. 3, so that the rounded upper ends of the latches 44 will be engaged by these beveled surfaces when the bed is being righted and will be swung outward far enough to enable the pins to pass down into engagement therewith.

As previously described, the pivotal axis of the bed 17 is located slightly back of the transverse center line of the bed. Notwithstanding such location of the pivot 29, which throws the center of gravity of the bed proper forward of its transverse axis, because of the counterweight 36, the bed will tend to return to its normal position on the truck frame after having been emptied. When, however, the bed is loaded, its center of gravity is shifted by the load to a point in advance of its transverse axis, and consequently the overbalancing weight of the load in the front portion of the bed will usually suffice to dump it when the latches 44 are released. The dumping may, however, be assisted either manually, or by running the truck up to the dumping point and then stopping it suddenly, so that the inertia of the load will help to revolve the bed to dumping position. After the load has been dumped, the preponderating weight of the counterbalance 36 will be approximately sufficient to swing the bed back to normal position, so that little if any effort on the part of the operator is required to start the bed swinging back to normal position. This counterbalanced condition of the bed when empty also enables the operator to restore the bed to normal position automatically by backing away from the point of dumping and then starting forward rather suddenly, the inertia of this forward start operating to swing the bed back to its normal position.

By virtue of the downwardly extending ends 18 of the frame members 5, the bed is permitted to swing down to a relatively sharp dumping angle as illustrated in dotted lines, even with the bed pivoted to dispose its center of gravity and the center of gravity of the load substantially in the vertical axial plane of the driving wheels 6. This location of the pivotal axis of the bed adjacent the vertical axial plane of the driving wheels—made possible by the downwardly inclined end portions 18—also has the advantage of reducing the overall length of the vehicle, which is of great importance as these vehicles must often operate in a comparatively cramped space.

What we claim as our invention and desire to secure by Letters Patent of the United States, is:

1. In a dump truck of the class described, a frame-work including side members, bosses attached to said side members, and projecting upward therefrom, a dumping bed pivotally mounted on said bosses, a counterweight attached to said bed, said weight being recessed to fit between and on said side members to thereby support one end of said bed on said frame, latch pins attached to said counterweight, and a latch attached to said frame and engaging said pins to hold the bed and counterweight on said frame.

2. In a dump truck of the class described, a frame-work including side members, a dumping bed attached to said frame and pivoted about a transverse axis disposed above said frame, a counterweight attached to the under side of said bed at one end thereof, said weight resting on said side members to support one end of said bed thereon and to prevent movement of that end longitudinally of said axis, latch pins attached to said counterweight and a latch pivoted on said frame and engaging said pins to hold the counterweight and bed thereon.

3. In a dump truck of the class decribed, a frame work including side members, bosses attached to and projecting upward from said side members, a dumping bed including side members, a shaft projecting through bed members and bosses to support the bed on the frame with its side members parallel to the frame members and to pivot it about an axis transverse of the frame, said bosses fitting between the bed side members to resist movement of the bed longitudinally of said axis, a counterweight attached to the under side of said bed between its side members, said weight being recessed to fit between and on said frame side members to thereby support one end of said bed on said frame and to prevent movement of the bed longitudinally of said axis, latch pins attached to said counterweight, and a latch attached to said frame and engaging said pins to hold the bed and counterweight on the frame.

ROBERT J. BURROWS.
HARLOW D. BURNSIDE.